(12) United States Patent
Johnson et al.

(10) Patent No.: US 10,979,806 B1
(45) Date of Patent: Apr. 13, 2021

(54) AUDIO SYSTEM HAVING AUDIO AND RANGING COMPONENTS

(71) Applicant: Apple Inc., Cupertino, CA (US)

(72) Inventors: Martin E. Johnson, Los Gatos, CA (US); Jonathan D. Sheaffer, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/389,835

(22) Filed: Apr. 19, 2019

Related U.S. Application Data (60) Provisional application No. 62/666,644, filed on May 3, 2018.

(51) Int. Cl.
| | | |
|---|---|---|
| *H04R 3/00* | (2006.01) | |
| *G06T 7/70* | (2017.01) | |
| *H04N 5/247* | (2006.01) | |
| *H04R 1/40* | (2006.01) | |

(52) U.S. Cl.
CPC .............. *H04R 3/005* (2013.01); *G06T 7/70* (2017.01); *H04N 5/247* (2013.01); *H04R 1/406* (2013.01)

(58) Field of Classification Search
CPC .......... H04R 3/005; H04R 1/406; G06T 7/70; H04N 5/247
USPC ............................................................ 381/92
See application file for complete search history.

(56) References Cited

U.S. PATENT DOCUMENTS

| | | |
|---|---|---|
| 5,214,615 A | 5/1993 | Bauer |
| 7,760,248 B2 | 7/2010 | Marks et al. |
| 9,489,948 B1 | 11/2016 | Chu et al. |
| 9,736,613 B2 | 8/2017 | Osman |
| 2012/0093320 A1* | 4/2012 | Flaks ............... A63F 13/44 381/17 |
| 2015/0271341 A1* | 9/2015 | Kleiner ............ H04W 12/0608 455/411 |

* cited by examiner

*Primary Examiner* — Ammar T Hamid
(74) *Attorney, Agent, or Firm* — Womble Bond Dickinson (US) LLP (57) ABSTRACT

An audio system having a depth capturing device and a microphone array to respectively detect a point cloud and a local sound field, is described. The point cloud includes points corresponding to objects in a source space, and the local sound field includes sounds received in respective directions from the source space. The audio system includes one or more processors to generate a global sound field based on distances to the points and directions of the sounds. The global sound field includes virtual sound sources emitting respective sounds at respective points. A speaker can render the virtual sound sources to a user in a virtual space that corresponds to the source space.

22 Claims, 6 Drawing Sheets

AUDIO SYSTEM HAVING AUDIO AND RANGING COMPONENTS

This application claims the benefit of priority of U.S. Provisional Patent Application No. 62/666,644, filed on May 3, 2018, which is incorporated herein by reference in its entirety to provide continuity of disclosure.

BACKGROUND

Field

Embodiments related to audio systems are disclosed. More particularly, embodiments related to audio systems for rendering virtual sound sources to a user are disclosed.

Background Information

Virtual reality and augmented reality environments can include virtual sound sources, which are computer-generated sound sources in a virtual space. The virtual space can map to an actual space. For example, a user may wear headphones in a room and the headphones can reproduce a sound to the user as though the sound is a voice of a colleague in front of the user, even though the colleague is actually in another room. As the user moves in the room, e.g., as the user walks forward five paces, the reproduced sound can change. For example, the headphones can reproduce the sound to the user as though the colleague is now behind the user. Accurate rendering of the virtual world requires that the colleague be recorded in a manner that identifies a location of the colleague in the other room. When the location is identified, the recording can be reproduced to the user in a manner that localizes the reproduced sound as if the sound is coming from a similar location in the room that the user occupies.

Existing methods of reproducing a sound image to an observer in a virtual space includes mounting a multitude of microphones within an actual space, e.g., a room, that is to be associated with the virtual space. The distributed microphones record a sound field from the room and localize sound sources based on audio detected by each of the microphones. For example, the microphones are distributed around the room, in corners and along the walls or ceiling, and picked up audio from the separated microphones can be combined to determine a location of a sound source that is making the sound.

SUMMARY

In existing methods of reproducing a sound image to an observer in a virtual space, the microphones that are distributed around the actual space must be spaced apart from one another in order to rely on the detected sound for source localization. Accordingly, such methods do not allow for a single, compact microphone array to be used for sound source localization, and equipment and installation costs of such methods can be substantial.

In an embodiment, an audio system includes a ranging component, such as a depth capturing device or range imaging device, and an audio component, such as a compact microphone array, to detect and localize sounds within a source environment. The depth capturing device and the microphone array can be collocated within a system housing. Accordingly, the audio system can occupy a smaller footprint than existing systems for imaging sounds for virtual reality applications. The depth capturing device can be a camera array, or another depth detector, to detect a point cloud including several points in a field of view. The microphone array can capture a local sound field, which is one or more sounds arriving in respective directions from the field of view. The audio system may include one or more processors to generate a global sound field based on a combination of the point cloud and the audio signals captured by the microphone array. For example, the global sound field has one or more virtual sources localized within the field of view based on the distance detected by the depth capturing device and the direction detected by the microphone array. Accordingly, the audio system is a combined audio plus ranging audio system having audio and ranging components. Each virtual sound source can correspond to a sound received by the microphone array. The audio system can include a speaker located in a geographical separate environment, and the speaker can be used to generate an audio output to render the one or more virtual sound sources to a user. More particularly, the speaker plays back the sounds associated with the one or more virtual sound sources in a virtual or augmented reality environment to cause the user to perceive the sounds as being localized similarly in the virtual environment as to the sound location in the source environment.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

DETAILED DESCRIPTION

Embodiments describe an audio system having a depth capturing device and a microphone array to independently detect a point cloud and a local sound field, and processor(s) to reconstruct a global sound field, e.g., at any point in the room, based on the point cloud and the recorded audio data. The audio system may be used for virtual reality or augmented reality applications, e.g., to render a virtual reality environment to a user. The audio system may, however, be used for other applications, such as telecommunications applications.

In various embodiments, description is made with reference to the figures. However, certain embodiments may be practiced without one or more of these specific details, or in combination with other known methods and configurations. In the following description, numerous specific details are set forth, such as specific configurations, dimensions, and processes, in order to provide a thorough understanding of the embodiments. In other instances, well-known processes and manufacturing techniques have not been described in particular detail in order to not unnecessarily obscure the description. Reference throughout this specification to "one embodiment," "an embodiment," or the like, means that a particular feature, structure, configuration, or characteristic described is included in at least one embodiment. Thus, the appearance of the phrase "one embodiment," "an embodiment," or the like, in various places throughout this specification are not necessarily referring to the same embodiment. Furthermore, the particular features, structures, configurations, or characteristics may be combined in any suitable manner in one or more embodiments.

The use of relative terms throughout the description may denote a relative position or direction. For example, "in front of" may indicate a location in a first direction away from a reference point. Similarly, "behind" may indicate a location in a second direction away from the reference point and opposite to the first direction. Such terms are provided to establish relative frames of reference, however, and are not intended to limit the use or orientation of an audio system to a specific configuration described in the various embodiments below.

In an aspect, an audio system has a depth capturing device and a microphone array to independently detect a point cloud and a local sound field. The point cloud is a set of data points representing points on surfaces and objects within a space. The local sound field is a set of audio recordings representing sounds received from the space. The depth capturing device can detect a distance to the points, and the microphone array can detect a direction of the sounds. The distance information and the direction information can be combined to localize the sounds within the space, e.g., to associate the sounds of the local sound field with respective points of the point cloud. In other words, the visual depth capturing device provides distance information which facilitates a complete volumetric three-dimensional capture in all spherical dimensions, azimuth, elevation, and distance. Localization of the sounds can be performed without the need to distribute the microphones around the space, since locations of the points are determined by the depth capturing device and not the microphone array. Accordingly, the microphones of the microphone array can be collocated with each other and collocated with the depth capturing device in an audio system housing. Collocation of the audio system components can reduce an overall footprint of the audio system as compared to existing methods of reproducing a sound image to an observer in a virtual space.

It should be noted that visual information obtained by the depth capturing device can contain information on the different sound generating objects in the room, whereas information obtained by the microphone array may contain information on both the sound generating objects as well as their energy reflected from the various surfaces in the room. Disambiguation of what is a sound source, and what is reflected energy, may be used to correctly exploit visual information provided by the depth capturing device. As such, the array processing may employ a multichannel de-reverberation algorithm, effectively separating out the direct and reverberant components of the local sound field. Once the components of the local sound field are separated, visual information can be used in correspondence with the direct acoustic component of the captured local sound field. More particularly, the visual information can be associated with the direct acoustic component and not the reverberant components.

Figure 1:
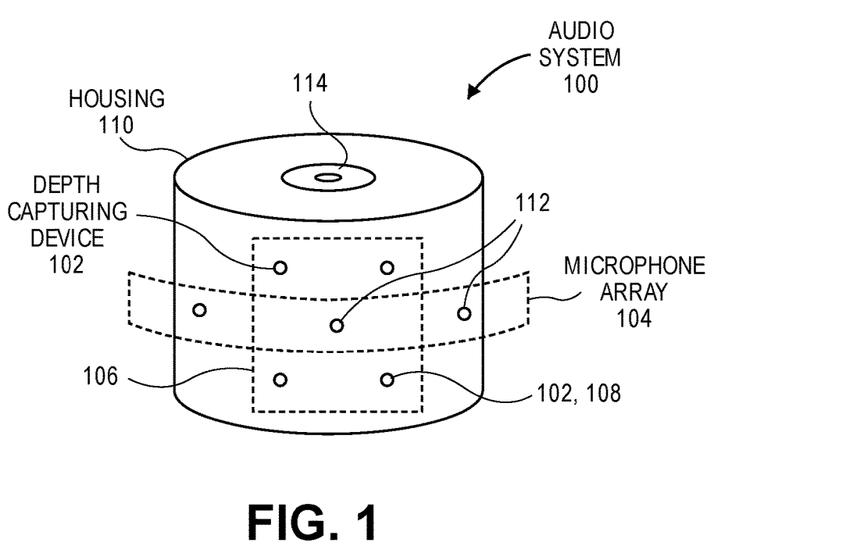
FIG. 1 is a pictorial view of an audio system having a depth capturing device and a microphone array, in accordance with an embodiment.

Referring to FIG. 1, a pictorial view of an audio system having a depth capturing device and a microphone array is shown in accordance with an embodiment. An audio system 100 can include components to provide contemporaneous ranging and audio pickup from sound sources in a surrounding environment. For example, audio system 100 can include a depth capturing device 102 to detect a point cloud within the surrounding environment, and a microphone array 104 to capture a local sound field within the surrounding environment. The terms "point cloud" and "local sound field" are further defined below.

Depth capturing device 102 can be one of several different types of ranging devices for detecting distance of an object. In an embodiment, depth capturing device 102 includes a camera array 106. For example, camera array 106 may be a stereoscopic system having two or more cameras 108. Several cameras 108 can be adjacent to each other and/or spaced apart from each other and looking at a same space. Cameras 108 may be mounted on an external surface of a housing 110 of audio system 100. In an embodiment, camera array 106 has a camera grid, e.g., a 2×2 grid of cameras as shown in FIG. 1, a 4×4 grid of cameras, a 5×5 grid of cameras, etc. The number of cameras 108 incorporated in audio system 100 can be limited by a target product size and cost. Each camera 108 can detect the same space from a different vantage point, and thus, by analyzing image data from each camera 108, a distance from camera array 106 to different points and/or objects within the images can be determined. Depth capturing device 102 can therefore be used to perform photogrammetry or another range imaging technique.

Other ranging devices may be incorporated in audio system 100 to determine distances to points and/or objects within a source environment. For example, depth capturing device 102 may include a LiDAR system to measure distances to the points and/or objects using pulsed laser light. Similarly, depth capturing device 102 may include laser scanners that use triangulation, interferometry, or time of flight; photometric systems (in which case camera array 106 may be a single camera 108); and other 3D scanners to perform photogrammetry or another range imaging technique.

In an embodiment, microphone array 104 includes several microphones 112. For example, microphone array 104 can include two or more microphones 112 adjacent to and/or spaced apart from each other. In an embodiment, microphones 112 are collocated in a compact area. For example, microphones 112 may be mounted on the external surface of housing 110. Microphones 112 can be evenly distributed along the external surface to receive sounds from the source environment. Microphones 112 can receive the sounds at different, but proximate, locations on housing 110.

Depth capturing device 102 and microphone array 104 can be collocated within housing 110. For example, depth capturing device 102 can be located on the external surface of housing 110 to receive radiant energy from a field of view, and microphone array 104 can be located on the external surface to receive sound arriving at housing 110 from the field of view. Other components of audio system 100 may be collocated within housing 110. For example, housing 110 may contain a speaker 114 to output audio to a person within the source environment. The audio output by speaker 114 could be voice prompts by audio system 100 or telecommunications audio from a remote transmitter. Housing 110 can also contain one or more processors (FIG. 7) to receive and process data from depth capturing device 102 or microphone array 104, as described below. The processors can generate a sound field based on audio data from the microphones 112 and ranging data, e.g., photogrammetry data, from the depth capturing device 102, and thus, audio system 100 is a combined audio and ranging based audio system.

Figure 2:
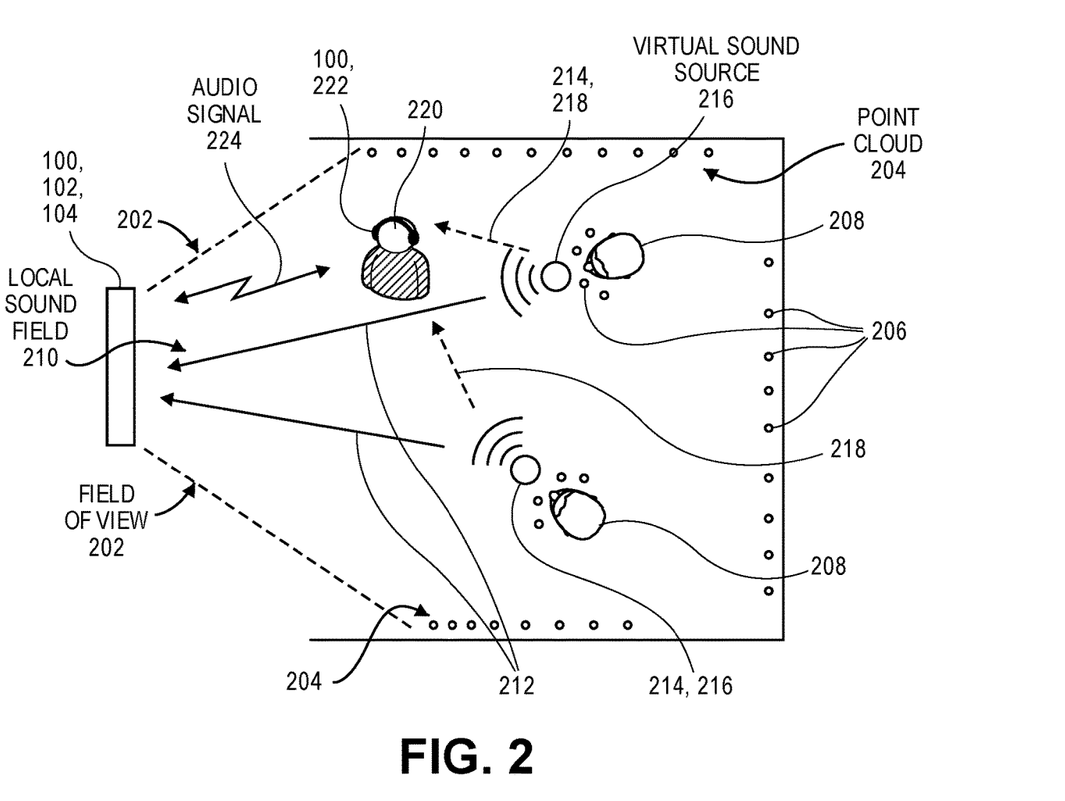
FIG. 2 is a schematic view of an audio system used to reconstruct a global sound field based on a point cloud and a local sound field, in accordance with an embodiment.

Referring to FIG. 2, a schematic view of an audio system used to reconstruct a global sound field based on a point cloud and a local sound field is shown in accordance with an embodiment. Depth capturing device 102 can have an observable field of view 202. For example, field of view 202 of a camera 108 can include an angle of view in one or more directions, e.g., horizontally or vertically, that is captured by an image sensor of the camera. In the case of depth capturing device 102 having several cameras 108 of camera array 106, field of view 202 may include the respective fields of view of each camera 108. The respective fields of view can overlap. Images captured by each camera 108 may be static, e.g., photographs, or dynamic, e.g., movies. In an embodiment, the overlapping fields of view of cameras 108 in camera array 106 can be combined to define a total area of field of view 202.

In an embodiment, depth capturing device 102 can be used to measure a point cloud 204 of surface points that lie within field of view 202. Point cloud 204 can include several points 206 in field of view 202. For example, when field of view 202 includes a portion of a room, points 206 can be at locations within the three-dimensional space of the room that are viewable by camera array 106. The points 206 may be defined as coordinates within the room that are in a line of sight of depth capturing device 102. Points 206 may be measured along a wall of the room, and at one or more objects 208 within the room. Points 206 can be combined to form point cloud 204. Object(s) 208 can be between depth capturing device 102, e.g., camera array 106, and the room walls. Accordingly, object(s) 208 can create shadows in the point cloud 204 along the walls.

In addition to point cloud 204 detected by depth capturing device 102, microphone array 104 of audio system 100 can detect a local sound field 210 including one or more sounds 212 arriving in respective directions from field of view 202. More particularly, whereas point cloud 204 can include several points 206 detected at locations having a distance from depth capturing device 102, local sound field 210 can include one or more sounds 212 detected in directions from microphone array 104. When depth capturing device 102 is collocated with microphone array 104 in housing 110, the direction detected by the microphone array 104 may be substantially the same as, e.g., parallel to, a line of sight to an object 208 making the sound 212. For example, when object 208 is a speaking person, a voice of object 208 will propagate along a direction that has a same horizontal azimuth within field of view 202 as the radiant energy that depth capturing device 102 uses to image or range object 208.

Point cloud 204 detected by depth capturing device 102 and local sound field 210 detected by microphone array 104 can be combined to determine a sound field 214 of the source environment. The microphone array 104 of limited size may not be able to accurately determine a distance of a sound source. Microphone array 104, however, is able to measure an angle of arrival of sounds 212. Accordingly, each sound 212 can be localized at a point 206 based on the direction sensed by microphone array 104 and the distance sensed by camera array 106.

Global sound field 214 may be a virtual representation of audio within the source environment. More particularly, sound field 214 can include one or more virtual sound sources 216 corresponding to sounds 212 that are detected by microphone array 104. Each virtual sound source 216 can emit a respective virtual sound 218 as a sound 212 of local sound field 210 at a point 206 of point cloud 204. Sound field 214 is virtual in that it is not spatially bound. That is, sound field 214 can be reproduced in a virtual environment at any geographic location by playing back virtual sounds 218 to simulate the actual sounds recorded at the source environment.

Audio system 100 can include one or more processors to generate sound field 214 based on point cloud 204 and local sound field 210. The reconstruction provided by sound field 214 may not be an accurate representation of a true sound field occurring in the source environment. Sound field 214 may, however, provide a plausible representation of the true sound field over a range of points of views. Those points of views can be the perception of virtual sounds 218 rendered to user 220 in a virtual or augmented reality environment corresponding to the source environment. That is, sound field 214 can be reproduced in a virtual environment to simulate the source environment.

The source environment and the virtual environment are overlaid in FIG. 2; however, the environments may be geographically separated. More particularly, user 220 may experience the virtual reality environment at a location that is geographically separated from the source environment within which audio system 100 is placed. For example, a portion of audio system 100 having microphone array 104 and camera array 106 may be located in an office in a first city, and user 220 may be in another office in a second city. One or more virtual sound sources 216 may be rendered to user 220 in the virtual reality environment by reproducing the sound field detected by audio system 100. More particularly, audio system 100 can include a speaker 222 to generate an audio output, and the audio output may render the virtual sound sources 216 to user 220. Speaker 222 may be worn by user 220. In an embodiment, user 220 wears headphones that include speaker 222 to provide binaural rendering of the virtual sound sources 216 directly at the ears of user 220. Accordingly, a large number of virtual sound sources 216 can be rendered without physically constructing a speaker array around user 220.

The audio output that is played back to user 220 by speaker 222 may be based on an audio signal 224 generated by audio system 100. A portion of audio system 100 that provides audio signal 224 to speaker 222 can be in the same room as user 220 or in the source environment. For example, a first portion of audio system 100 having microphone array 104 and camera array 106 may be located in the source environment in the first city. The first portion may communicate signals with a second portion of audio system 100 located in the same room as user 220 in the second city. The first portion may have a telecommunications transmitter circuit configured to transmit audio signal 224 to a telecommunications receiver circuit of the second portion. In turn, the second portion can transmit audio signal 224 to speaker 222 via a short range wireless technology standard, e.g., Bluetooth. Accordingly, audio system 100 can include a transmitter base station having microphone array 104 and/or camera array 106, a receiver base station configured to receive audio signal 224, point cloud data, or local sound field data from the transmitter base station, and speaker 222 configured to communicate wirelessly with the receiver base station. Examples of point cloud data and local sound field data generation are provided below.

Figure 3:
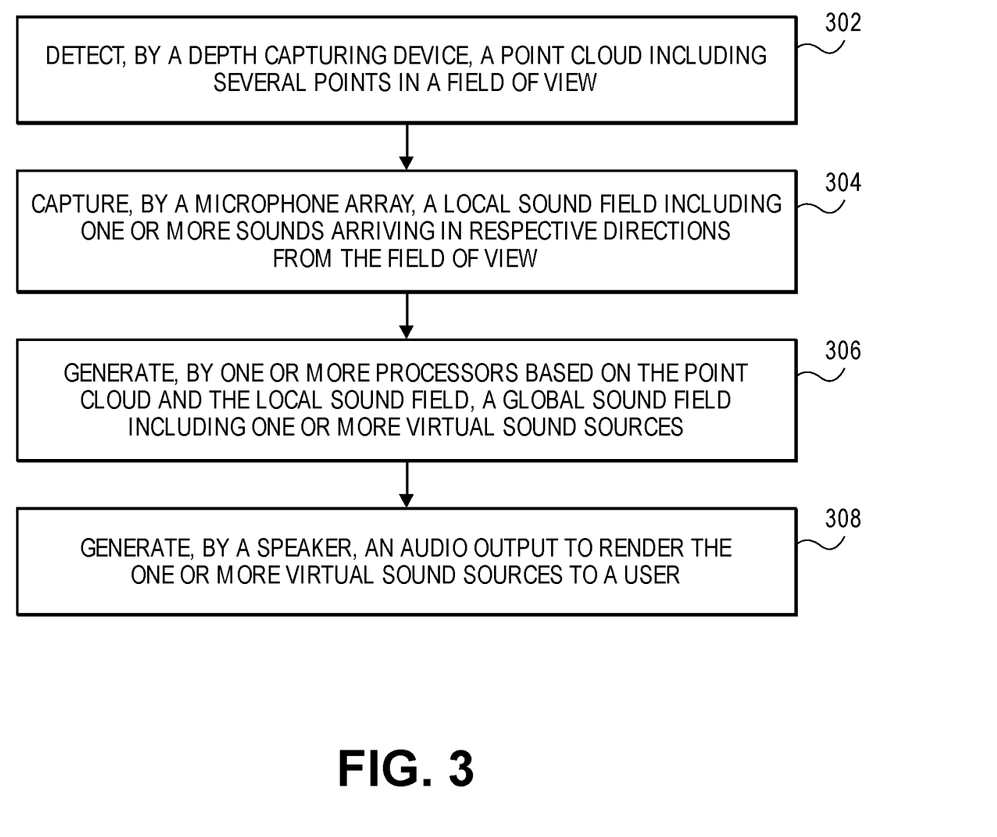
FIG. 3 is a flowchart of a method of reconstructing a global sound field by an audio system based on a point cloud and a local sound field, in accordance with an embodiment.
Figure 4:
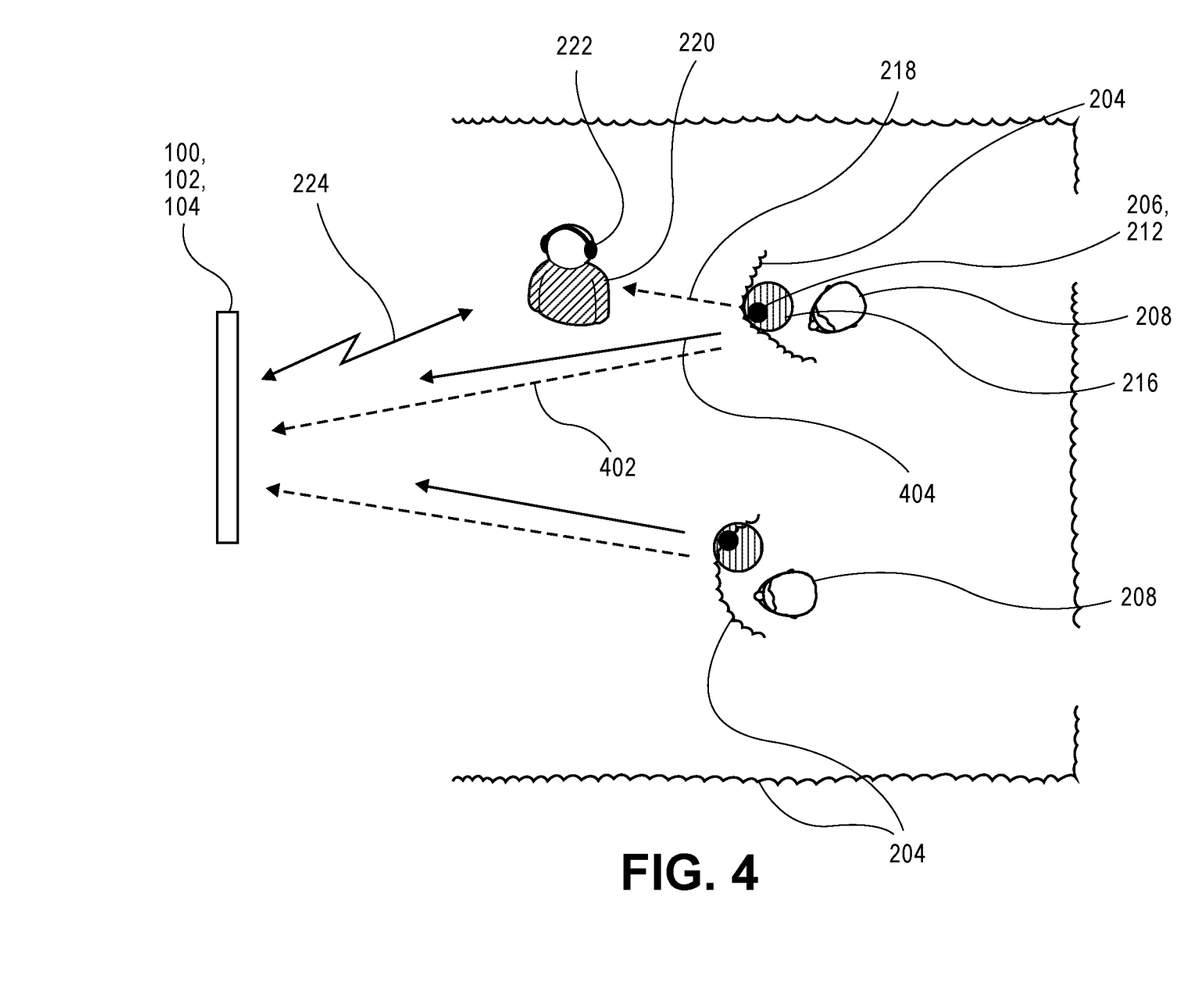
FIG. 4 is a schematic view of an audio system having collocated ranging and audio recording devices, in accordance with an embodiment.

Referring to FIG. 3, a flowchart of a method of reconstructing a sound field by an audio system based on a point cloud and a local sound field is shown in accordance with an embodiment. Referring to FIG. 4, a schematic view of an audio system having collocated ranging and audio recording devices is shown in accordance with an embodiment. The method of FIG. 3 corresponds to the schematic view shown in FIG. 4, and thus, those figures are described in combination below.

At operation 302, depth capturing device 102 detects point cloud 204 having several points 206 in field of view 202. Depth capturing device 102, e.g., camera array 106, is used to build up or render point cloud 204 in space as indicated by the fuzzy lines in FIG. 4. Point cloud 204 can be constructed using photogrammetry or other range imaging techniques, e.g., taking several pictures from different points of view to construct room and object geometry from the pictures. The points 206 form a representation of the surfaces of objects 208 that are visible to the cameras 108 of depth capturing device 102. Individual points 206 corresponding to audio sources are highlighted along the fuzzy lines for illustrative purposes. Each of the highlighted points 206 is within field of view 202 of depth capturing device 102. In an embodiment, radiant energy from highlighted points 206 propagates along a respective depth line 402 (indicated by hashed lines) to depth capturing device 102. The processor(s) of audio system 100 may be configured to determine distances between depth capturing device 102 and objects 208 within the surrounding environment. In an embodiment, the processor(s) are configured to determine a depth line 402 extending from depth capturing device 102 to a respective point 206.

At operation 304, microphone array 104 captures local sound field 210 having one or more sounds 212 arriving in respective directions from field of view 202. The sounds 212 can hit microphone array 104 from different directions within the source environment. The processor(s) of audio system 100 may be configured to determine directions of sound 212 received by microphone array 104 from the surrounding environment. In an embodiment, the processor(s) are configured to determine a sound line 404 extending from microphone array 104 to the respective sound 212. An angle of incidence of the sound 212 at microphone array 104 can be assigned to the sound 212. For example, the sound 212 may have an azimuth relative to a reference line that extends normal to the external surface of audio system housing 110. Microphone array 104 is used to determine sounds 212 to decompose a local sound field 210 of the source environment. The local sound field 210 can be a sound map, e.g., a map of sounds within a certain field of listening relative to microphone array 104. For example, the sound map may determine sounds 212 from all directions, e.g., may be a 2π sound map, or may determine sounds 212 from all directions in front of microphone array 104, e.g., may be a 4π sound map.

At operation 306, one or more processors of audio system 100 generate global sound field 214 based on point cloud 204 and local sound field 210. Global sound field 214 includes one or more virtual sound sources 216 corresponding to objects 208 within the surrounding environment. Audio sources are created by projecting the audio back onto the surface of point cloud 204. In an embodiment, the processor(s) of audio system 100 project the respective sounds 212 onto respective points 206 at a location where sound line 404 of the sound 212 intersects depth line 402 of a point 206. The sound 212 is projected along the angle of incidence determined by microphone array 104 to the distance determined by camera array 106, and thus, sound 212 is projected onto point 206. For example, in FIG. 4, sound 212 is received by microphone array 104 along sound line 404. Sound 212 propagates in the direction of sound line 404 from an object 208 at point 206 to audio system 100. Sound 212 can be a voice of a person in the room, by way of example. The person can be within field of view 202 of camera array 106, and consequently, light from the face of the person can propagate along depth line 402 to camera array 106. Camera array 106 can detect a distance to the face of the person along depth line 402. Accordingly, audio system 100 collects data about a distance to point 206 and records sound 212 received from the source environment in a direction of point 206.

Depth capturing device 102 may be collocated with microphone array 104 in audio system housing 110. Depth line 402 extending to point 206 and sound line 404 extending in a direction of point 206 may be in substantially the same direction. For example, depth capturing device 102 and microphone array 104 may be separated by a distance along the external surface of audio system 100 housing 110, which is less than 5% of the distance between audio system 100 and point 206. Accordingly, depth line 402 and sound line 404 may be substantially parallel to each other between audio system 100 and point 206. Sound 212 from point 206 can therefore be projected onto point 206 of point cloud 204 to create virtual sound source 216 on point cloud 204 in the direction of sound 212.

At operation 308, speaker 222 replays virtual sound sources 216 to user 220. More particularly, speaker 222 can generate audio output to render the virtual sound source(s) 216 to user 220. Sound 212 can be reconstructed from virtual sound source 216 on the boundary of point cloud 204. For example, user 220 who is shown near point 206, but in reality may be in another room, may listen to headphones that binaurally render virtual sound 218 as a sound coming from virtual sound source 216. Delay and gain of audio signal 224 played back by headphones may be adjusted such that user 220 perceives virtual sound 218 as coming from point 206. User 220 can move through the virtual reality environment to change a point of view relative to virtual sound source 216. As user 220 moves, delay and gain of audio signal 224 may be further adjusted to render virtual sound 218 as coming from the correct location as determined by microphone array 104 and camera array 106. Accordingly, user 220 may move around the scene, and virtual sounds 218 can change to simulate relative movement between user 220 and a virtual object that corresponds to object 208 in the source environment.

The above examples describe reconstruction of a global sound field using an audio system having collocated depth capturing device 102 and microphone array 104. Other embodiments exist within the scope of this description. For example, depth capturing device 102 and microphone array 104 may not be collocated.

Figure 5:
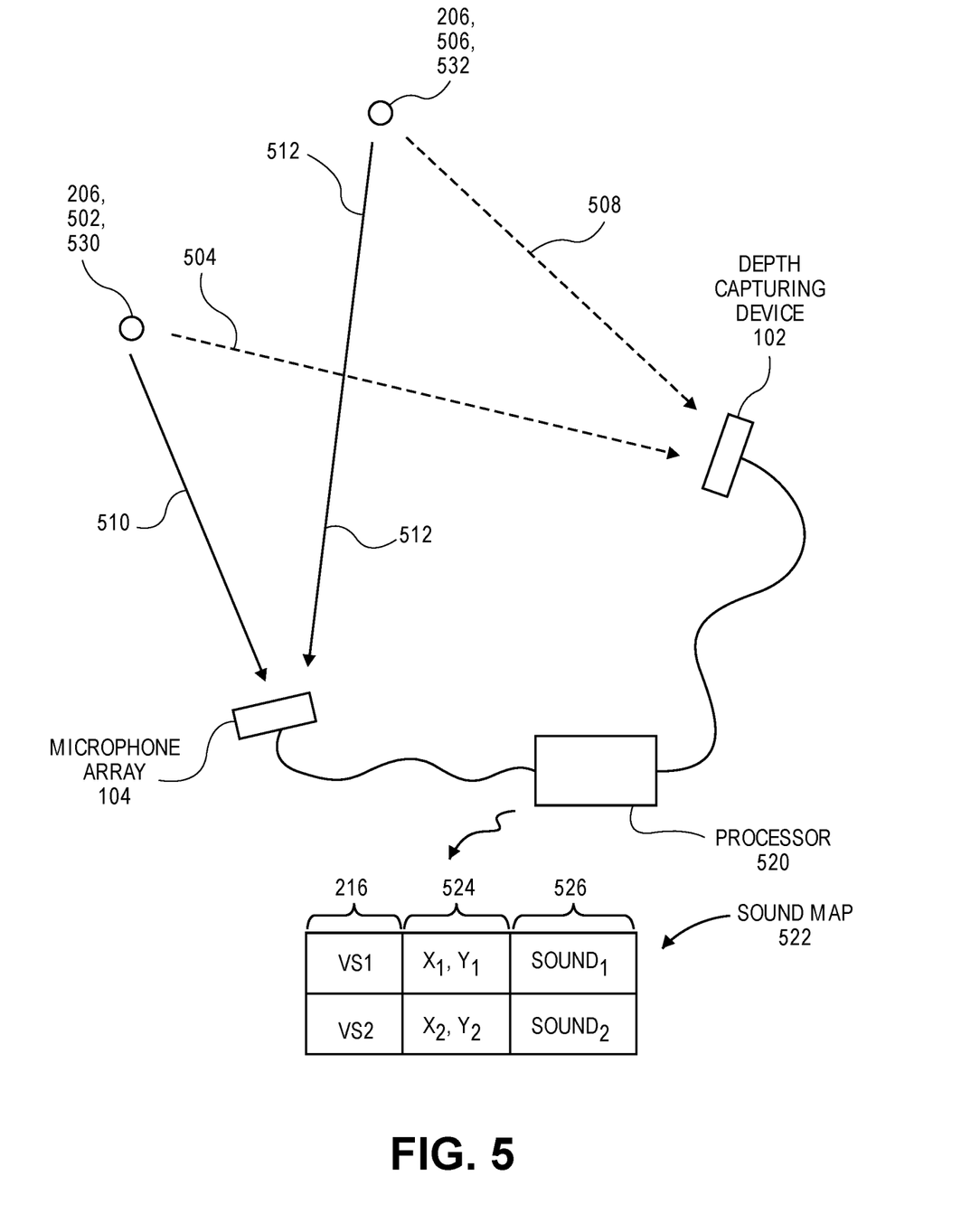
FIG. 5 is a schematic view of an audio system having non-collocated ranging and audio recording devices, in accordance with an embodiment.

Referring to FIG. 5, a pictorial view of an audio system having non-collocated ranging and audio recording devices is shown in accordance with an embodiment. In an embodiment, depth capturing device 102 and microphone array 104 are not collocated within housing 110. Given that an angle of arrival of radiant energy and acoustic energy can differ significantly at the separate detectors, a mathematical transformation can be used to associate a sound received at microphone 112 with a particular point 206 that is ranged by depth capturing device 102.

Points 206 of point cloud 204 can be at different distances from depth capturing device 102. For example, a point 206 may be at a first location 502 along the first depth line 504 from depth capturing device 102, and a point 206 may be at second location 506 along the second depth line 508 from depth capturing device 102. The respective depth lines 402 may not be parallel, and a distance to first location 502 along first depth line 504 may be different than a distance to second location 506 along second depth line 508. First location 502 and second location 506 may also be at different distances and in different directions from microphone array 104. Sound from point 206 at first location 502 can propagate to microphone array 104 along a first sound line 510, and sound from point 206 at second location 506 can propagate to microphone array 104 along a second sound line 512.

When microphone array 104 and depth capturing device 102 are not collocated, depth lines 402 corresponding to points 206 as viewed by depth capturing device 102 and sound lines 404 corresponding to the points 206 as listened to by microphone array 104 may not be in substantially the same direction. Distance data detected by depth capturing device 102 and direction data detected by microphone array 104 may nonetheless be combined to determine the location of the points 206. For example, first depth line 504 and first sound line 510 may not be substantially parallel; however, the lines can intersect at first location 502. Similarly, second depth line 508 and second sound line 512 may not be substantially parallel; however, the point 206 at second location 506 can be localized where the lines intersect in space.

In an embodiment, a sound line extending from microphone array 104 to a respective sound can intersect at least two depth lines at respective points 206 of point cloud 204. For example, when both first location 502 and second location 506 are distributed along first sound line 510, e.g., when first sound line 510 and second sound line 512 are parallel, first sound line 510 can intersect first depth line 504 at first location 502, and first sound line 510 can intersect second depth line 508 at second location 506. In such case, the sound arriving at microphone array 104 along first sound line 510 can be projected onto the nearest intersection point. More particularly, the sound detected along first sound line 510 can be projected onto point 206 at first location 502, which is nearer to microphone array 104 than second location 506.

Projection of sounds onto locations within field of view 202 can be performed by a processor 520 of audio system 100. Processor 520 can be connected to depth capturing device 102 and microphone array 104 to receive image and audio data from those components. Processor 520 can process the received data to generate a sound map 522 that represents virtual sound sources 216 distributed within field of view 202. More particularly, each virtual sound source 216 that is created within sound map 522 can be associated with a mapped location 524 within field of view 202 and a mapped sound 526 received from field of view 202. Rather than sound 212 appearing to come from an infinite distance away in a direction, the sound can be pegged to a specific location, which is a finite distance away in the direction.

Sound map 522 may be a data structure containing variables and values representing global sound field 214. Sound map 522 can include a first row corresponding to a first virtual sound source 530 at first location 502, and a second row corresponding to a second virtual sound source 532 at second location 506. First virtual sound source 530 may be associated with coordinate data indicating that mapped location 524 of first virtual sound source 530 is first location 502. Similarly, second virtual sound source 532 may be associated with coordinate data indicating that mapped location 524 of second virtual sound source 532 is second location 506. The coordinate data is shown in FIG. 5 as having an X and Y component, e.g., within a horizontal plane. It will be appreciated that the coordinate data can also include a Z component, e.g., in a vertical direction orthogonal to the horizontal plane. Furthermore, the coordinate system used to determine or describe a position of the virtual sound sources can be a Cartesian coordinate system, as illustrated in FIG. 5, or another type of coordinate system such as a polar coordinate system, a cylindrical coordinate system, etc. Sound map 522 can include audio data, e.g., data representing sounds received from the respective virtual sound source locations by microphone array 104. First virtual sound source 530 may be associated with audio data representing the mapped sound 526 received from first location 502, and second virtual sound source 532 may be associated with audio data representing the mapped sound 526 received from second location 506. Processor 520 can generate global sound field 214 based on sound map 522 because, for any position of user 220 within the virtual environment, a respective distance and direction to the user can be determined relative to mapped locations 524 of mapped sounds 526. Accordingly, appropriate mathematical transformations may be made to generate audio signal 224 that renders virtual sounds 218 to user 220 in a manner that causes user 220 to perceive that that virtual sounds 218 are mapped sounds 526 coming from mapped locations 524 in the virtual environment.

In certain instances it is necessary to disambiguate the location of sounds being detected by microphone array 104. An example is provided above, related to parallel sound lines that intersect several depth lines. Rather than localizing the received sounds to the nearest point 206 of point cloud 204, as discussed above, in an embodiment depth capturing device 102 determines a most likely origin of the sound. For example, depth capturing device 102 may be configured to capture an image of field of view 202. The image can be static or dynamic, e.g., a still image or a video. Processor 520 of audio system 100 may be configured to perform object recognition on the image to detect object(s) 208 corresponding to the respective points 206 of point cloud 204. For example, processor 520 can determine that, based on the image, an object at first location 502 is a tree and an object at second location 506 is a person standing behind the tree relative to microphone array 104. The object recognition can be face recognition, and the person may be disambiguated from the tree based on facial features, such as eyes. Accordingly, processor 520 may be configured to project the sound onto the object, e.g., the person, at point 206 at second location 506 based on the object recognition.

Visual information obtained by depth capturing device 102 may contain information about different sound generating objects in field of view 202, whereas information obtained by microphone array 104 may contain information about both the sound generating objects as well as their energy reflected from various surfaces in the room. More particularly, microphone array 104 can capture a direct sound component and a reverberant sound component radiating from the sound generating objects. Disambiguation of what is a sound source, and what is reflected energy, may be used to correctly exploit visual information provided depth capturing device 102. More particularly, one or more processors of audio system 100 can employ a multichannel de-reverberation algorithm to separate the direct sound component(s) from the reverberant sound component(s) of local sound field 210. Once the sound components are separated, visual information can be used in correspondence with the direct acoustic component of the captured local sound field 210. More particularly, the visual information can be associated with the direct sound component(s) and not the reverberant sound component(s).

Other disambiguation techniques, such as detecting movement of objects by depth capturing device 102, may be used to assign a likelihood that each point 206 of point cloud 204 corresponds to a virtual sound source 216. Such disambiguation techniques can avoid confusion, e.g., to localize sound to a living entity and not an inanimate object when the living entity is near the inanimate objects.

Figure 6:
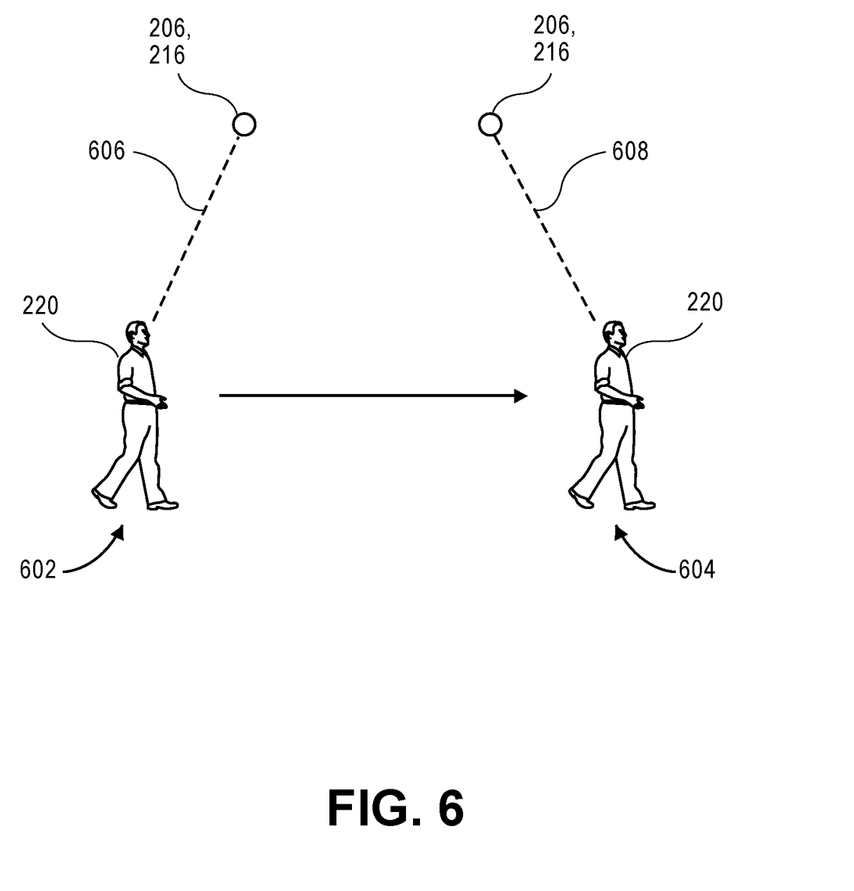
FIG. 6 is a pictorial view of a virtual sound source being rendered to a user by an audio system, in accordance with an embodiment.

Referring to FIG. 6, a pictorial view of a virtual sound source being rendered to a user by an audio system is shown in accordance with an embodiment. Audio output provided to user 220, e.g., by speaker 222 of headphones, can be adjusted to render the virtual sound source(s) 216 differently when user 220 moves within the virtual environment. For example, user 220 can move around in the virtual environment from a first position 602 relative to point 206 associated with virtual sound source 216, to a second position 604 relative to the same point 206. Audio output when user 220 is at first position 602 can be a first audio output 606 associated with respective delays and gains configured to render virtual sound source 216 as being in a first direction and at a first distance relative to user 220. Audio output when user 220 is at second position 604 can be a second audio output 608 associated with respective delays and gains configured to render virtual sound source 216 as being in a second direction and at a second distance relative to user 220. The first set of delay and gain parameters is different than the second set of delay and gain parameters such that virtual sound source 216 is rendered to user 220 dynamically, e.g., to cause user 220 to perceive virtual sound source 216 as remaining fixed at an absolute location while user 220 moves positions within the virtual environment. Similarly, virtual sound source 216 may be dynamic to match a moving point 206 of point cloud 204, e.g., when images captured by depth capturing device 102 in the source environment include a moving person. The necessary mathematical transformations may be made to ensure that the movements of the objects within the source environment are replicated within the virtual environment.

From the description above, it will be appreciated that movement of a virtual sound source within the field of view can be detected in local sound field 210 and reproduced to user 220 in the virtual environment. For example, when a sound producing object 208 moves backward within the field of view, e.g., away from the position of the capturing devices, delay and gain of audio signal 224 can be adjusted to render virtual sound 218 corresponding to the produced sound as retreating from user 220 within the virtual environment. Similarly, user 220 can move through the virtual reality environment to change a point of view relative to virtual sound source 216, and as user 220 moves, delay and gain of audio signal 224 may be adjusted to render virtual sound 218 as coming from the correct location as determined by microphone array 104 and camera array 106. Accordingly, rendering of virtual sound 218 can account for movement of objects 208 and/or user 220 within respective frames of reference.

In an embodiment, rendering of virtual sound 218 can account for motion of audio system components. More particularly, rendering of virtual sound 218 can take into account a position (or change in position) of depth capturing device 102 and/or microphone array 104 relative to a frame of reference or a datum. The frame of reference may be a predetermined space or surface. For example, the frame of reference may a room within which capturing devices 102, 104 are located. Alternatively, the datum may be a predetermined location in space, e.g., a predetermined location in the room. For example, the datum may be a GPS coordinate where housing 110 is initially mounted in the room.

When housing 110 moves within the frame of reference or moves relative to the datum, the motion can be detected and compensated for. More particularly, any movement of points 206 or sounds 212 detected by the ranging and audio components can be adjusted to account for movement of the capturing devices. By way of example, when someone picks up housing 110 and moves the capturing devices rightward relative to the datum where housing 110 was initially set, the capturing devices would detect a corresponding leftward movement of the points or sounds even when the sound producing object remains fixed relative to the datum. In an embodiment, audio system 100 detects movement of housing 110, and adjusts sound map 522 such that mapped location 524 for virtual sound source 216 is accurately located relative to the frame of reference or datum. Audio system 100 can detect a first movement of the depth capturing device and the microphone array relative to the frame of reference or the datum. Audio system 100 can also detect a second movement of the respective point of a virtual sound source relative to the depth capturing device and the microphone array, and the second movement may at least partially correspond to the first movement. For example, when the system moves and the object making sound remains stationary, the movement of the system in a first direction is determined, and a corresponding shift of the intersection between the depth line and the sound line is detected as moving in a second direction opposite to the first direction from a first location to a second location. The sound map coordinates can be adjusted by the difference in the first location and the second location such that the sound map coordinates of the intersection remain at the first location. More generally, the location of the respective point in the global sound field can be adjusted by a difference between the first movement detected for the system and the second movement detected for the respective point. Accordingly, audio output provided to user 220 to render virtual sound source 216 in the virtual environment will remain constant, e.g., virtual sound source 216 will be perceived as being stationary even though object 208 moves relative to the capturing devices (but is stationary relative to the datum).

A use case to further illustrate the technical applicability of the above description is now provided. In an embodiment, user 220 may wish to observe a performance by one or more people located at a remote location. The transmitting base station of audio system 100 can be placed at the remote location to record a scene in which the performers make sounds, e.g., vocal or instrumental sounds. A receiving base station of audio system 100, which may be installed in the same room as user 220, can receive the recording. Audio and/or video data of the recording may be provided to components of audio system 100 worn by the user 220, e.g., headphones and/or a virtual reality headset. The user-mounted components can reproduce the scene to user 220 by playing video through the headset and/or playing back audio through speaker 222. As user 220 walks through the room the scene changes. For example, when user 220 is at first position 602, the performers can be experienced through the virtual-reality components as singing or playing an instrument in front of user 220. As user 220 walks forward, the replayed video and audio can be adjusted such that the performers and the sounds they make are rendered to the user 220 as though user 220 is now behind the performers. In brief, audio system 100 provides a realistic rendition of a virtual reality environment to user 220.

Figure 7:
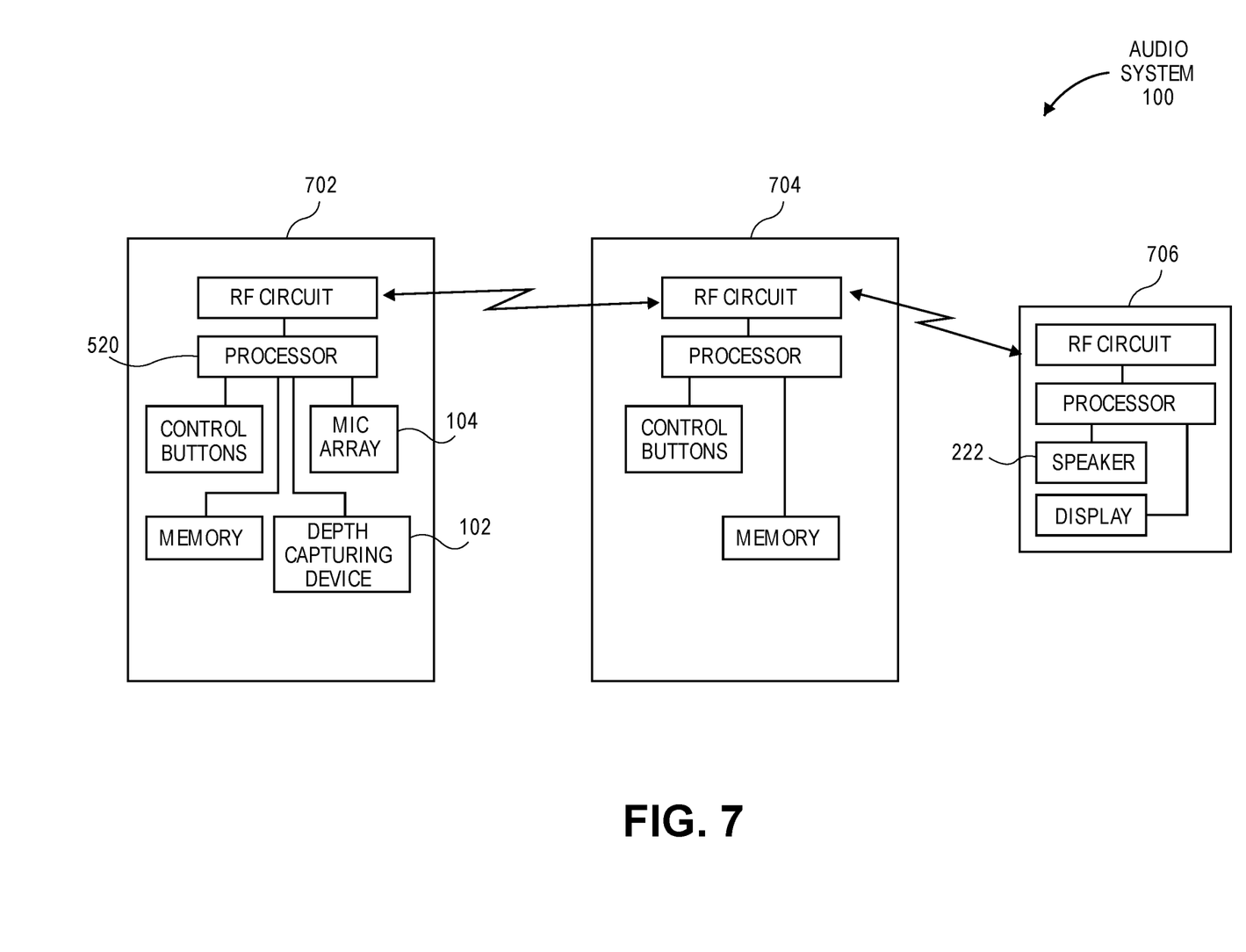
FIG. 7 is a block diagram of an audio system, in accordance with an embodiment.

Referring to FIG. 7, a block diagram of an audio system is shown in accordance with an embodiment. Audio system 100 may be any of several types of portable or stationary devices or apparatuses with circuitry suited to specific functionality. Accordingly, the diagrammed circuitry is provided by way of example and not limitation. Audio system 100 may include one or more geographically distributed components. For example, audio system 100 can include a transmitter base station 702 located in a source environment, a receiver base station 704 located geographically apart from the source environment, and a headset 706 located within wireless communication range of the receiver base station 704. Each component of audio system 100 may include one or more processors 520 to execute instructions to carry out the different functions and capabilities described above. Instructions executed by the processor(s) 520 may be retrieved from memory collocated with the processor 520, i.e., memory of the respective system component. The memory may include a non-transitory machine-readable medium. The instructions may be in the form of an operating system program having device drivers and/or an audio mapping or an audio rendering engine for mapping a global sound field 214 and rendering a virtual sound source 216 to a user 220 according to the methods described above. The processor(s) 520 may also retrieve audio data associated with an augmented reality or virtual reality application program that runs on top of the operating system. To perform such functions, processor(s) 520 of the various system components may directly or indirectly implement control loops and receive input signals from and/or provide output signals to other electronic components. For example, the base stations may receive input signals from physical or virtual control buttons.

The base stations can transmit sound map 522 and/or audio signal 224. Sound map 522 and audio signal 224 can contain data to render global sound field 214 to user 220 in an augmented reality or virtual reality environment. Processor 520 of transmitter base station 702 can receive input data from microphone array 104 and depth capturing device 102, and combine the received data to generate sound map 522. Sound map 522 may be transmitted by transmitter base station 702 to receiver base station 704 via respective telecommunication circuitry, e.g., RF circuitry. Similarly, receiver base station 704 can have a processor that performs mathematical transformations on sound map 522 to generate audio signal 224. Audio signal 224 can be communicated wirelessly from receiver base station 704 to headset 706 via respective telecommunications circuitry, e.g., RF circuitry via wireless technology standards such as Bluetooth. Audio signal 224 can contain audio data. Headset 706 can receive and playback the audio data via speaker 222 to render virtual sound 218 of a virtual sound source 216 to user 220. In addition to audio signal 224, one or more of the processors of audio system 100 can generate visual data, which is relayed to and played back by a display of headset 706. Accordingly, user 220 wearing headset 706 can experience the scene occurring in the source environment while immersed in a virtual environment rendered by headset 706 at a geographically separate location.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An audio system, comprising:
   an audio system housing;
   a depth capturing device in the audio system housing to detect a point cloud including a plurality of points in a field of view within a first environment;
   a microphone array in the audio system housing to capture a local sound field including one or more sounds arriving in respective directions from the field of view within the first environment;
   one or more processors to
     determine a distance from the depth capturing device to a point of the point cloud,
     determine a direction of arrival of a sound of the local sound field at the microphone array, and
     generate, based on the point cloud and the local sound field, a virtual sound field including one or more virtual sound sources, wherein the virtual sound field includes a virtual sound source to emit the sound at the point based on the direction of arrival at and the distance from the audio system housing; and
   a transmitter circuit configured to transmit the virtual sound field to a receiver circuit in a second environment geographically separated from the first environment for reproducing the virtual sound field within the second environment.

2. The audio system of claim 1, wherein the one or more processors are configured to generate the virtual sound field by:
   determining a depth line extending from the depth capturing device to the point;
   determining a sound line extending from the microphone array to the sound; and
   projecting the sound onto the point at a location where the depth line intersects the sound line.

3. The audio system of claim 2, wherein the depth capturing device is collocated with the microphone array in the audio system housing such that the depth line and the sound line extend in substantially a same direction.

4. The audio system of claim 1, wherein the plurality of points of the point cloud are at different distances from the depth capturing device along respective depth lines.

5. The audio system of claim 4, wherein a sound line extending from the microphone array to the sound intersects at least two of the respective depth lines at respective points of the point cloud.

6. The audio system of claim 1, wherein the depth capturing device is configured to capture an image of the field of view, wherein the one or more processors are configured to perform object recognition on the image to detect an object corresponding to the point, and wherein the one or more processors are configured to project the sound onto the object at the point based on the object recognition.

7. The audio system of claim 1 further comprising:
   a transmitter base station having the depth capturing device, the microphone array, the one or more processors, and the transmitter circuit; and a receiver base station having the receiver circuit and a speaker to generate an audio output to reproduce the virtual sound field within the second environment, wherein the audio output renders the one or more virtual sound sources to a user in the second environment, and wherein the audio output renders the one or more virtual sound sources differently when the user is at a first position than when the user is at a second position.

8. The audio system of claim 1, wherein the depth capturing device includes a camera array having a plurality of cameras, and wherein the microphone array includes a plurality of microphones.

9. A method, comprising:
  detecting, by a depth capturing device in an audio system housing, a point cloud including a plurality of points in a field of view within a first environment;
  detecting, by a microphone array in the audio system housing, a local sound field including one or more sounds arriving in respective directions from the field of view within the first environment;
  determining a distance from the depth capturing device to a point of the point cloud;
  determining a direction of arrival of a sound of the local sound field at the microphone array;
  generating, by one or more processors based on the point cloud and the local sound field, a virtual sound field including one or more virtual sound sources, wherein the virtual sound field includes a virtual sound source to emit the sound at the point based on the direction of arrival at and the distance from the audio system housing; and
  transmitting, by a transmitter circuit, the virtual sound field to a receiver circuit in a second environment geographically separated from the first environment for reproducing the virtual sound field within the second environment.

10. The method of claim 9, wherein generating the virtual sound field includes:
  determining a depth line extending from the depth capturing device to the point,
  determining a sound line extending from the microphone array to the sound, and
  projecting the sound onto the point at a location where the depth line intersects the sound line.

11. The method of claim 10, wherein the depth capturing device is collocated with the microphone array in the audio system housing such that the depth line and the sound line extend in substantially a same direction.

12. The method of claim 11 further comprising:
  detecting a first movement of the depth capturing device and the microphone array relative to a datum;
  detecting a second movement of the point relative to the depth capturing device and the microphone array; and
  adjusting, by the one or more processors, the location of the point in the virtual sound field by a difference between the first movement and the second movement.

13. The method of claim 9, wherein the plurality of points of the point cloud are at different distances from the depth capturing device along respective depth lines.

14. The method of claim 9 further comprising:
  capturing, by the depth capturing device, an image of the field of view;
  performing, by the one or more processors, object recognition on the image to detect an object corresponding to the point; and
  projecting the sound onto the object at the point based on the object recognition.

15. The method of claim 9, wherein the depth capturing device, the microphone array, the one or more processors, and the transmitter circuit are included in a transmitter base station, and further comprising receiving, by the receiver circuit included in a receiver base station, the virtual sound field, and generating, by a speaker included in the receiver base station, an audio output to render the one or more virtual sound sources to a user in the second environment, and wherein the audio output renders the one or more virtual sound sources differently when the user is at a first position than when the user is at a second position.

16. A non-transitory machine readable medium storing instructions, which when executed by one or more processors of an audio system, causes the audio system to perform a method comprising:
  detecting, by a depth capturing device in an audio system housing, a point cloud including a plurality of points in a field of view within a first environment;
  detecting, by a microphone array in the audio system housing, a local sound field including one or more sounds arriving in respective directions from the field of view within the first environment;
  determining a distance from the depth capturing device to a point of the point cloud;
  determining a direction of arrival of a sound of the local sound field at the microphone array;
  generating, by one or more processors based on the point cloud and the local sound field, a virtual sound field including one or more virtual sound sources, wherein the virtual sound field includes a virtual sound source to emit the sound at the point based on the direction of arrival at and the distance from the audio system housing; and
  transmitting, by a transmitter circuit, the virtual sound field to a receiver circuit in a second environment geographically separated from the first environment for reproducing the virtual sound field within the second environment.

17. The non-transitory machine readable medium of claim 16, wherein generating the virtual sound field includes:
  determining a depth line extending from the depth capturing device to the point,
  determining a sound line extending from the microphone array to the sound, and
  projecting the sound onto the point at a location where the depth line intersects the sound line.

18. The non-transitory machine readable medium of claim 17, wherein the depth capturing device is collocated with the microphone array in the audio system housing such that the depth line and the sound line extend in substantially a same direction.

19. The non-transitory machine readable medium of claim 18 further comprising:
  detecting a first movement of the depth capturing device and the microphone array relative to a datum;
  detecting a second movement of the point relative to the depth capturing device and the microphone array; and
  adjusting, by the one or more processors, the location of the point in the virtual sound field by a difference between the first movement and the second movement.

20. The non-transitory machine readable medium of claim 16, wherein the plurality of points of the point cloud are at different distances from the depth capturing device along respective depth lines.

21. The non-transitory machine readable medium of claim 16 further comprising
- capturing, by the depth capturing device, an image of the field of view,
- performing, by the one or more processors, object recognition on the image to detect an object corresponding to the point, and
- projecting the sound onto the object at the point based on the object recognition.

22. The non-transitory machine readable medium of claim 16, wherein the depth capturing device, the microphone array, the one or more processors, and the transmitter circuit are included in a transmitter base station, wherein the method further comprises receiving, by the receiver circuit included in a receiver base station, the virtual sound field, and generating, by a speaker included in the receiver base station, an audio output to render the one or more virtual sound sources to a user in the second environment, and wherein the audio output renders the one or more virtual sound sources differently when the user is at a first position than when the user is at a second position.

\* \* \* \* \*